Sept. 26, 1967     A. J. GODSHALK     3,343,711
PLASTIC CONTAINERS
Filed Aug. 4, 1965     3 Sheets-Sheet 3
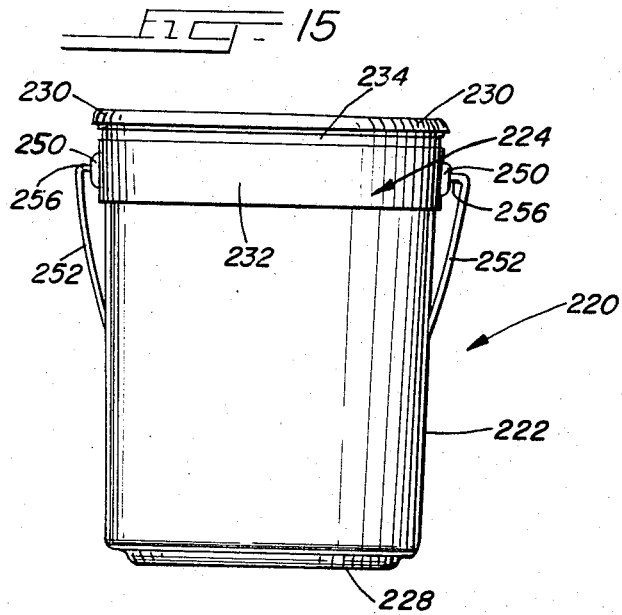
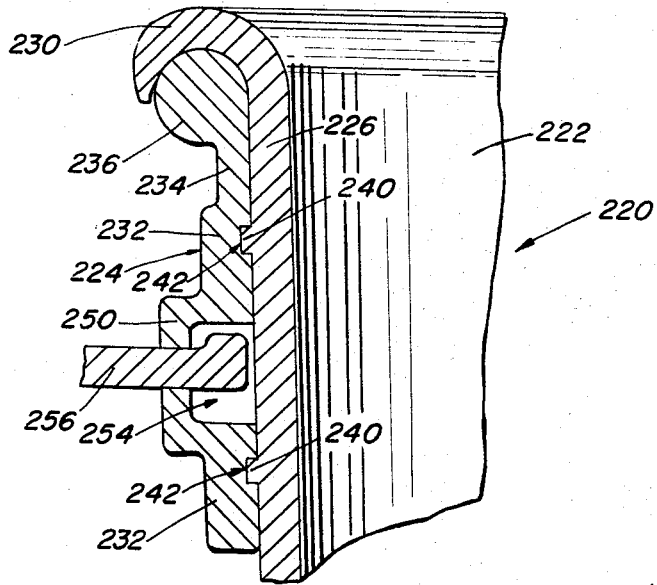
INVENTOR
ALVA J. GODSHALK

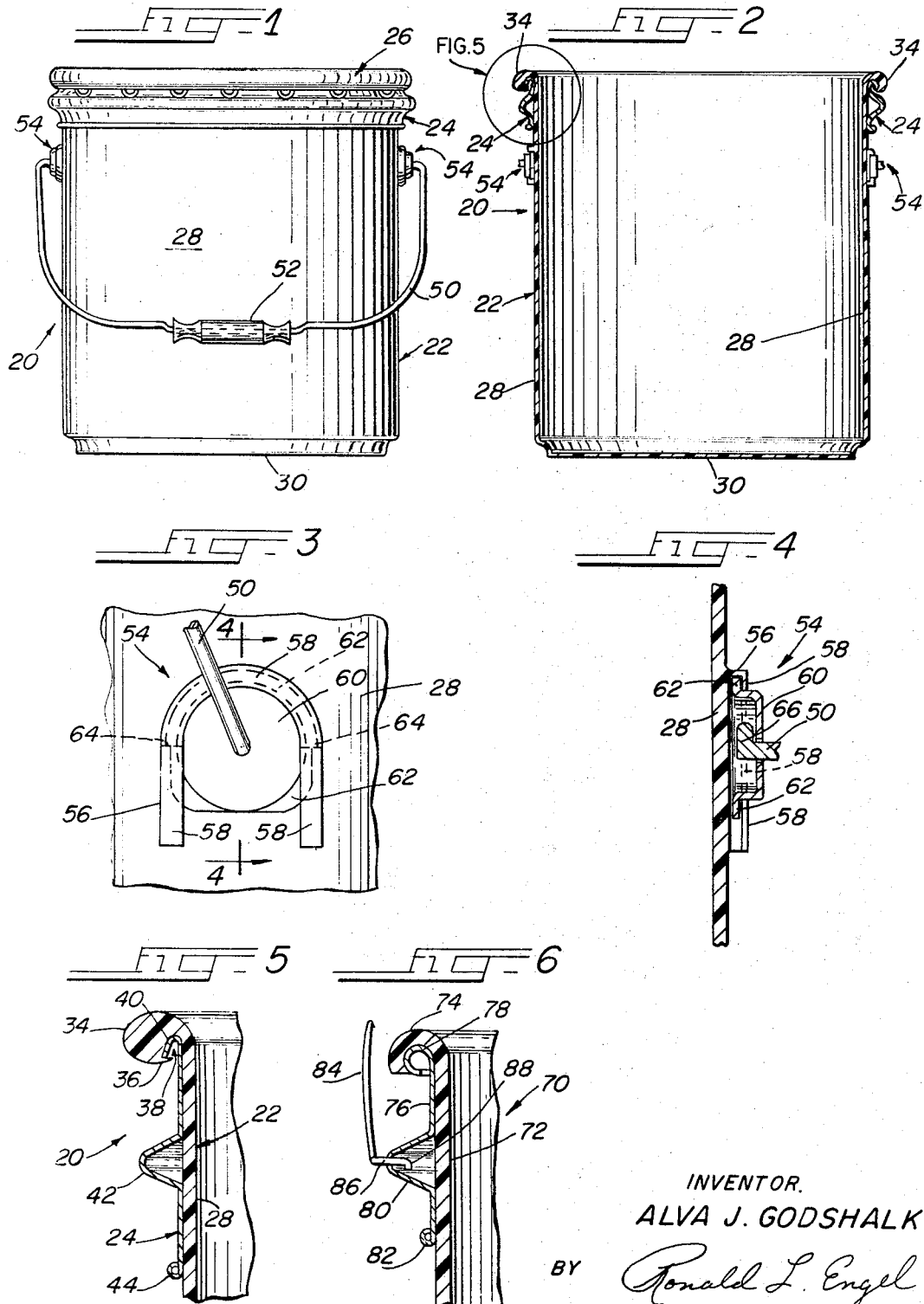

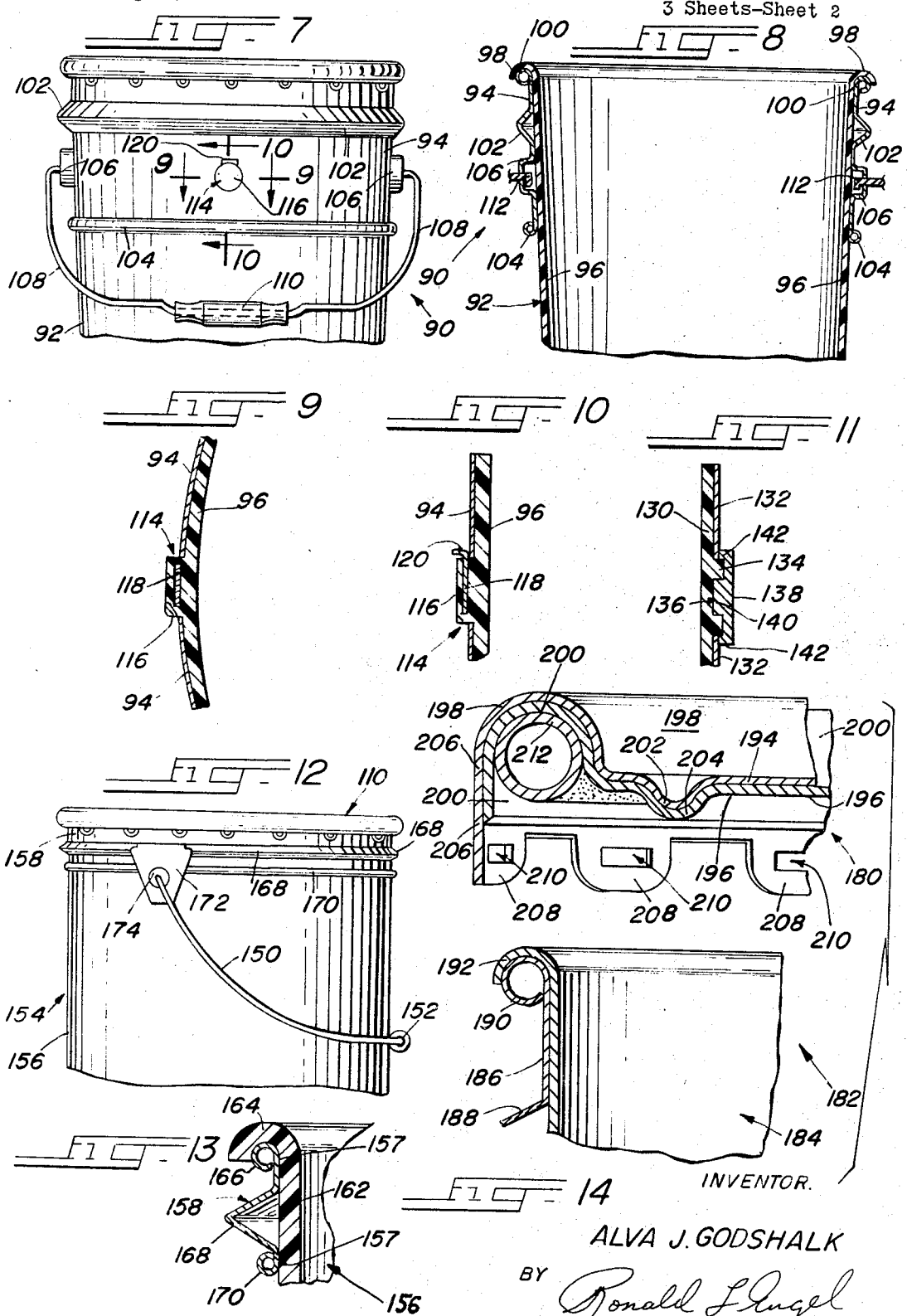

United States Patent Office 3,343,711
Patented Sept. 26, 1967

3,343,711
PLASTIC CONTAINERS
Alva J. Godshalk, Homewood, Ill., assignor to Bennett Industries Inc., Peotone, Ill., a corporation of Illinois
Filed Aug. 4, 1965, Ser. No. 479,687
11 Claims. (Cl. 220—73)

ABSTRACT OF THE DISCLOSURE

A plastic pail provided with a reinforcing supporting collar adjacent its open end can be made sufficiently strong and distortion-free to withstand the abuses of freight handling and shipping where the collar is formed of a material (such as steel, fiber impregnated plastic, and the like) that is substantially more rigid than the plastic material of the pail. In addition, such a pail is capable of accepting conventional closure members, such as lug, band, or lever interlocking type closures. The supporting collar of metal or fiber impregnated plastic is attached to the plastic pail adjacent the open end thereof. The collar may either be press-fitted to the pail, or, alternatively, interlocking means may be provided in order to positively attach the supporting collar to the plastic pail. For example, a plurality of openings may be provided in the metal supporting collar, and protuberances on the pail may extend through the openings. A locking key may be inserted in each protuberance, or, alternatively, plastic attaching members may be fused to the protuberances by means of spin or ultrasonic welding techniques.

---

This application is a continuation-in-part of co-pending United States patent application Ser. No. 460,443, filed June 1, 1965, now abandoned.

This invention relates generally to plastic containers and more particularly to a reinforced open end plastic container in the form of a plastic pail equipped with a supporting collar formed of a material that is substantially more rigid than the plastic material of the pail.

Shippers and stores have long sought a container that would be suitable for use in packaging, storing, and shipping liquids, semiliquids, and dry materials, and that could be fabricated from plastic rather than conventional metals such as steel. A plastic container suitable for shipping and storage would be more economical than a similarly sized metal container by reason of the comparatively higher cost of conventionally utilized metals (such as steel) in relation to plastics (such as polyethylene). Moreover, problems of corrosion, which often arise with metal containers, could be avoided since plastics are generally more resistant than metals to corrosion and other similar forms of attack. Additionally, the effective substitution of plastic for metal in a commercial container could yield significant economies with respect to the weight of the resultant container. However, despite these advantages, it has not heretofore been possible to use plastics for commercially acceptable shipping and storage containers because plastics are generally susceptible to distortion (e.g., due to impact) and are not sufficiently strong to insure safe, leak-proof packaging, storing, and shipping under the conditions to which such containers are subjected in transit and storage.

In accordance with the present invention, it has been found that a plastic pail provided with a reinforcing supporting collar adjacent its open end can be made sufficiently strong and distortion-free to withstand the abuses of freight handling and shipping, if the said collar is formed of a material (such as steel, fiber impregnated plastic, and the like) that is substantially more rigid than the plastic material of the pail. In addition, such a pail is capable of accepting conventional closure members, such as lug, band, or lever interlocking type closures.

In a preferred practice of the invention, a supporting collar of metal or fiber impregnated plastic is attached to the plastic pail adjacent the open end thereof. The collar may either be press-fitted to the pail, or, alternatively, interlocking means may be provided in order to positively attach the supporting collar to the plastic pail. For example, a plurality of openings may be provided in the metal supporting collar, and plastic attaching members may be fused to the pail through the openings in the collar by means of conventional spin or ultrasonic welding techniques. The present invention also provides unique means adapted to attach handle means such as a conventional bail to the container.

A primary object of the present invention is to provide a container comprising an open end plastic pail which has a supporting collar, formed of material substantially more rigid than the plastic material of the pail, mounted thereon adjacent the open end thereof and which is capable of withstanding shipping abuses.

Another object of the present invention is to provide a container of the character described which is capable of receiving conventional pail closures.

A further object of the present invention is to provide a container of the character described which can economically be formed of a plastic material having relatively thin walls, yet which is capable of withstanding freezing temperatures, of withstanding crushing when subjected to static loads, and of resisting cracking when vibrated, in conformity with the requirements for containers suitable for use in freight handling and shipping.

Yet another object is to provide a container, the parts of which may easily be fabricated in accordance with conventional techniques, and which can be assembled quickly and economically with a minimum amount of effort.

These and other objects, advantages, and features of the present invention will hereinafter appear, and, for purposes of illustration, but not of limitation, exemplary embodiments of the present invention are shown in the accompanying drawings, in which:

FIGURE 1 is a side elevational view of an embodiment of the present invention wherein the supporting collar interlocks with a flange of the plastic container;

FIGURE 2 is a vertical sectional view taken substantially through the center in FIGURE 1, with the closure member removed;

FIGURE 3 is an enlarged, fragmentary side elevational view of a unique bail attaching arrangement utilized in the embodiment of FIGURE 1;

FIGURE 4 is a sectional view taken along line 4—4 in FIGURE 3;

FIGURE 5 is an enlarged, fragmentary sectional view of a portion of the structure shown in FIGURE 2;

FIGURE 6 is a view, similar to FIGURE 5, of another embodiment of the present invention wherein the supporting collar is press-fitted onto the plastic container;

FIGURE 7 is a fragmentary side elevational view of yet another embodiment of the present invention wherein a keyed interlock is provided between the supporting collar and the plastic container;

FIGURE 8 is a vertical sectional view taken substantially through the center of the embodiment shown in FIGURE 7 with the closure member removed;

FIGURE 9 is an enlarged, fragmentary sectional view taken substantially along line 9—9 in FIGURE 7;

FIGURE 10 is an enlarged, fragmentary sectional view taken substantially along line 10—10 in FIGURE 7;

FIGURE 11 is an enlarged, fragmentary sectional view illustrating another arrangement for interlocking the supporting collar and the plastic container by means of a welded plastic retaining member;

FIGURE 12 is a fragmentary side elevational view of another approach for affixing a bail member to a container produced in accordance with the present invention wherein the supporting collar is adhesively secured to the plastic container;

FIGURE 13 is an enlarged, fragmentary vertical sectional view taken substantially through the center of the embodiment shown in FIGURE 12;

FIGURE 14 is an enlarged, fragmentary exploded vertical sectional view showing a conventional closure member in combination with a container produced in accordance with the present invention;

FIGURE 15 is a side elevational view of another embodiment of the present invention wherein a fiber impregnated plastic supporting collar is employed; and FIGURE 16 is an enlarged, fragmentary vertical sectional view taken substantially through the center in FIGURE 15.

With reference to the drawings, FIGURES 1 and 2 show a container 20 comprising an open end pail 22, formed of a suitable plastic material as hereinafter described, and an annular supporting collar 24, formed of metal, fiber impregnated plastic, or other suitable reinforcing material as hereinafter described. A conventional closure member 26 is shown affixed to the container 20.

The pail 22 comprises a cylindrical side wall 28 and a bottom 30 formed integrally therewith, as shown in FIGURES 1 and 2. As best shown in FIGURE 5, a downwardly facing bead 34 is formed along the upper edge of side wall 28 and a horizontally extending lip 36 is provided on bead 34. Lip 36 extends beneath an annular space 38 formed between bead 34 and wall 22 for a purpose that will hereinafter appear.

The pail 22 is preferably formed from suitable semi-rigid plastics having strength sufficient to withstand the abuses a shipping container must take. Polyethylene is an especially suitable plastic material, although other plastics of the polyolefin or petrochemical family may be employed. The pail 22 may conveniently be formed from such a plastic material by a conventional injection molding process, although other methods of formation may also be used. For example, a suitable pail for use according to the present invention would embody high density polyethylene side walls having a thickness of about 45 mils. However, as will be obvious to one skilled in the art, other materials and thicknesses may be utilized depending upon the size of the container, the material to be shipped, and the uses for which the pail is intended.

In order to strengthen the plastic pail 22, reinforcing collar 24 is provided adjacent the open end of pail 22. Collar 24 is preferably formed of metal, although any other reinforcing material that is substantially more rigid than the plastic pail (e.g., fiber impregnated plastic) may be employed.

As best shown in FIGURE 5, collar 24 has a downwardly facing bead 40 formed along its upper edge. When bead 40 is positioned within space 38, as shown in FIGURE 5, lip 36 interlocks with bead 40, and hence collar 24 is maintained in position adjacent the open end of pail 22. Thus, collar 24 may easily be attached to the preformed pail 22 by slipping it over the bottom end of the pail and urging it upwardly until bead 40 passes into opening 38 and is cammed into locking engagement with flexible lip 36.

Collar 24 is preferably provided with a central reinforcing bead 42 in order to impart added strength to collar 24. An upwardly facing bead 44 is formed along the lower edge of collar 24. Bead 44 is provided in order to add strength to collar 24 and, in addition, in order to eliminate the sharp lower edge of collar 24 which otherwise might cut into side wall 28 of pail 22.

If desired, a conventional wire bail 50, provided with a hand grip 52, may be attached to the container 20. In accordance with the present invention, the bail 50 is preferably attached directly to plastic pail 22 by means of an arrangement indicated generally at 54 in FIGURES 1-4. Thus, a plastic member 56 is formed integrally with side wall 28 on opposite sides of the pail 22 (see FIGURES 3 and 4). Member 56 has a flange 58 formed thereon so as to define a U-shaped slot. An ear 60, preferably formed of metal, has an out-turned flange 62 formed along its edge, and ear 60 is adapted to slide upwardly in the slot formed between flange 58 and wall 28. A pair of burrs 64 (shown in broken lines in FIGURE 3) are adapted to engage the plastic of member 56 so as to hold ear 60 in the position shown in FIGURE 3. As shown in FIGURE 4, bail 50 passes through an opening in ear 60, and an end 66 of bail 50 is bent over so as to hold bail 50 in position in ear 60. Bail 50 may, however, be pivoted in the opening in ear 60 between a rest position (see FIGURE 1) and a raised or carrying position. Thus, in this manner, the bail 50 may be suitably attached to pail 22 so as to have utility for lifting and carrying the container 20. As will hereinafter be described in detail, other means for attaching a handle such as bail 50 to the container 20 may be utilized, if desired.

A preferred method for mounting the supporting collar to the plastic collar is shown in FIGURE 6. In the embodiment of FIGURE 6, a pail 70 formed of plastic in the previously described manner has a side wall 72 which is curled over to form a downwardly facing bead 74. Bead 74 does not have a horizontal lip corresponding to lip 36 on bead 34 of the previously described embodiment. A supporting collar 76 is provided with a downward facing bead 78 formed at its upper edge, and bead 78 is adapted for press-fitting upwardly in the space formed between bead 74 and wall 72. There is no discrete mechanical interlock as such between beads 74, 79, as in the case of the previously described beads 34, 40. Instead, collar 76 is maintained in position on pail 70 by press-fitting (which is, however, a form of mechanical interlocking), and no other interlocking means as such need be provided. As with the previously described collar 24, a central reinforcing rib 80 is provided on collar 76, and a bead 82 is formed along the lower edge thereof.

The FIGURE 6 embodiment also utilizes a different method for attaching bail means to the container. Instead of attaching the bail means to the plastic pail (as in the embodiment illustrated in FIGURES 1-5), a bail 84 is attached to the collar 76. Thus, an end portion 86 of bail 84 pivotally passes through an opening in bead 80 on opposite sides of the pail 70 (only one side being shown in FIGURE 6). The bail 84 is freely pivotal in the bead 80 and hence may be used to lift and carry the pail 70. End 86 is turned over as shown at 88 in order to prevent bail 84 from being pulled away from collar 76.

Another container 90, produced in accordance with the present invention, is illustrated in FIGURES 7-10. Container 90 comprises a pail 92, formed of plastic in the previously described manner, and a supporting collar 94. Container 90 is shown in combination with a conventional closure member 95 in FIGURE 7. Pail 92 comprises a side wall 96 which tapers inwardly from the open end to the bottom thereof. The tapered side wall 96 is provided in order that several of the containers 90 may be stacked in a "nested" manner when empty.

Side wall 96 has a downwardly facing bead 98 formed at the upper edge thereof, and collar 94 has a downwardly facing bead 100 formed along its upper edge. Collar 94 extends downwardly of its associated pail relatively farther than the previously described supporting collars in order to impart added strength to pail 92. Collar 94 is also tapered inwardly to conform to the inwardly tapered shape of side wall 96 so that the previously described press-fit may be effected between collar 94 and pail 92. A central reinforcing bead 102 is provided in collar 94, and a bead 104 is also provided along the lower edge of collar 94. A pair of bail maintaining ears 106 are formed in collar 94 between bead 102 and bead 104 (see FIGURES 7 and 8), and the ends of a bail 108, which is provided with a handle 110, pass through openings in ears 106 and are turned over at 112 so as to prevent the bail from being pulled out of ears 106. Thus, the bail 108 may be pivoted between the rest position (shown in FIGURE 7) and a raised, carrying position.

In accordance with the embodiment of the present invention shown in FIGURES 7–10, means are provided for mechanically interlocking collar 94 and pail 92. A plurality of openings are provided in collar 94 between bead 102 and bead 104 as generally indicated at 114 in FIGURE 7. Only one such opening is shown in FIGURE 7, although any convenient number of such openings may be provided. Preferably, four or five openings are provided at equally spaced intervals around collar 94. A plastic protuberance 116 is formed integrally with wall 96, and the protuberance 116 is adapted to extend through the opening at 114. The protuberance 116 is provided with a vertically extending slot (see FIGURES 9 and 10). A key 118, provided with a turned over head portion 120, is adapted to be force fitted in the slot of protuberance 116. After key 118 is fitted in the said slot, collar 94 is firmly interlocked with side 96 of pail 92.

Another method for effecting a mechanical interlock between the supporting collar and the walls of the plastic pail is shown in FIGURE 11, wherein a wall 130 of a plastic pail and a supporting collar 132 are shown in combination. A protuberance 134 on wall 130 projects through an opening in collar 132. Protuberance 134 has a shallow central indentation 136 formed therein, and a flat-headed plastic retaining member 138 has an extending stud portion 140 which is adapted to be received in the indentation 136. The respective positions of member 138 and protuberance 134 with the former physically inserted in the latter are shown in FIGURE 11. By using conventional spin or ultrasonic plastic welding techniques, a welded bond may be formed between the member 138 and the protuberance 134 (primarily between stud 140 and indentation 136) so that an overhanging portion 142 of retaining member 138 is firmly positioned adjacent collar 132. In this manner a secure mechanical interlock is effected between collar 132 and pail wall 130.

As in the case of the arrangement shown in detail in FIGURES 9 and 10, a series of protuberances 134 and attaching members 138 may be provided at equally spaced intervals around a pail produced in accordance with the present invention. Preferably, about five such mechanical interlocks are provided in a typical five-gallon container.

FIGURE 12 illustrates another method by which a conventional bail 150, provided with a handle grip 152, may be attached to a container 154 produced in accordance with the present invention. Container 154 comprises a plastic pail 156 and a supporting collar 158 which is adhesively secured to pail 156 adjacent the open end thereof, as indicated at 157 in FIGURE 13. Any conventional adhesive, such as suitable epoxy resins, thermosetting adhesives, latex adhesives, etc., may be employed to effect the indicated plastic to metal joinder.

A conventional lug-type closure member 160 is attached to the open end of the container 154. As best shown in FIGURE 13, pail 156 has a side wall 162 which has an overturned bead 164 formed along its upper edge. Collar 158 is provided with a bead 166 along its upper edge, and bead 166 is adapted to fit inside the curl of bead 164. A centrally positioned reinforcing bead 168 is provided on collar 158, and a bead 170 is formed along the lower edge of collar 158. Collar 158 is maintained in position on pail 156 by means of the adhesive interlock effected therebetween.

A downwardly extending mounting plate 172, formed of metal or other suitable material, is attached by conventional means (e.g., a welded engagement) to collar 158, as shown in FIGURE 12. A conventional bail mounting ear 174 is attached to plate 172, and the end of bail 150 is pivoted in ear 174 in a conventional manner. A similar plate and ear (not shown) are provided on the opposite side of collar 158 so that bail 150 may be pivoted between the rest position shown in FIGURE 12 and a raised, carrying position.

FIGURE 14 illustrates an exploded view of a conventional closure member 180 adjacent a container 182 to which it may be attached in accordance with conventional techniques. Container 182 comprises a plastic pail 184 in combination with a supporting collar 186. Collar 186 has a reinforcing bead 188 (partially shown in the drawing) and an overturned bead 190 formed along its upper edge. Bead 190 is adapted to snugly fit inside a bead 192 formed along the upper edge of pail 184 in accordance with the preferred embodiment of the present invention.

Closure member 180 comprises a metal cover 194 and a plastic liner 196. Cover 194 and liner 196 are respectively provided with downwardly facing beads 198, 200 at the outer edges thereof. A cooperating pair of beads 202, 204 are also respectively formed in cover 194 and liner 196 in order to impart added strength to closure member 180. A metal flange 206 extends downwardly from bead 198 of cover 194 and terminates in a plurality of spaced lugs 208. Lugs 208 are provided with slots 210 which are adapted to receive a tool to be utilized to remove the cover from the container in a manner that will hereinafter be described.

A flexible sealing gasket 212 is positioned in the space defined by beads 198, 200 so that, when the closure member 180 is positioned on a container such as container 182, gasket 212 is compressed against bead 192 of container 182 so as to effect an airtight seal between closure member 180 and container 182. When closure member 180 is disposed on container 182 in the indicated manner, lugs 208 may be crimped under bead 190 of collar 186 by the use of conventional closing tools, so as to effect a mechanical connection between closure member 180 and container 182. As noted, the compression of gasket 212 effects an air and fluid-tight seal between overturned bead 192 of pail 184 and downwardly facing bead 200 of liner 196. In order to remove a closure member which has been applied in the foregoing manner, it is only necessary to insert a screwdriver or other suitable tool into the slots 210 of the lugs 208 in order to bend the lugs back to the position shown in FIGURE 14 so that the closure member 180 may be lifted away from the container 182.

Although one method for attaching a closure member to a container of the present invention has been described, it will be obvious to one skilled in the art that substantially any conventional closure member may be utilized in combination with containers produced in accordance with the present invention.

As has hereinbefore been descrbed, supporting collars produced in accordance with the present invention are formed of a material that is substantially more rigid than the plastic material from which the pail is molded. In addition to metals such as steel, the collar may be molded, preferably by conventional injection molding techniques, from fiber impregnated plastic. A suitable fiber impregnated plastic supporting collar comprises approximately 70 percent high density polyethylene and about 30 percent asbestos fiber. Asbestos fiber of the thixotropic flow type, for example, anthophyllite asbestos, is preferably employed. Of course, as will be obvious to one skilled in the art, various other plastics and fibers, as well as other percentage compositions, may be employed so long as the supporting collar is substantially more rigid than the plastic material of the pail.

FIGURES 15 and 16 illustrate a container 220 comprising a plastic pail 222, formed in the previously described manner, and a fiber impregnated plastic supporting collar 224. Pail 222 comprises an inwardly tapered side wall 226 and a bottom wall 228. Side wall 226 is tapered in order that several of the containers 220 may be stacked in a "nested" manner when empty. A downwardly facing curl 230 is formed along the upper edge of side wall 226. Collar 224 is provided with a relatively thick annular side wall 232, and a relatively thin neck portion 234 extends upwardly from the side wall 232. A bead 236 is formed along the upper edge of neck portion 234 and is adapted to be received within the curl 230 of pail 222 (see FIGURE 16).

A pair of bail maintaining ears 250 are molded on side wall 232 of collar 224 in order to pivotally mount a conventional bail 252. A hollow space 254 is defined by each ear 250, and an end portion 256 of bail 252 pivotally passes through an opening in each ear 250 and into the hollow portion 254. In this manner, bail 252 is pivotable between a lowered rest position shown in FIGURE 15 and a raised carrying position (not shown).

As shown in FIGURE 16, collar 224 is threadably interlocked with pail 222. Thus, a set of external threads 240 is molded on the pail 222 and a similar set of internal grooves 242 is provided on the inside of collar 224. Thus, collar 224 is seated in the position shown in FIGURES 15 and 16 by sliding it over the closed end of pail 222 and, when the threads 240 and grooves 242 are engaged, by rotating the collar 224 with respect to the pail 222 until bead 236 is snugly positioned in curl 230. The threads 240 and grooves 242 are preferably provided with burrs so that the collar 224 is locked in position with respect to the pail 222 and cannot be unscrewed therefrom. As will be obvious to one skilled in the art, other suitable arrangements of threads and grooves may be employed to attach the collar 224 to the pail 222. Alternatively, other interlocking means may be provided or collar 224 may be press-fitted to pail 222.

While a number of alternative forms have been described with reference to the features of the present invention, it should be understood that combinations of the described alternative forms may be utilized without deviating from the teachings of the present invention. It should further be understood that various other changes, variations, and modifications in structure and function may be effected without departing from the spirit and scope of the present invention, as defined in the appended claims.

What is claimed is:
1. A reinforced container comprising:
   an open end plastic pail having a downwardly facing bead adjacent the open end thereof;
   a cylindrical supporting collar formed of a material substantially more rigid than the plastic and having a downwardly facing bead along the upper edge thereof, the said collar being positioned externally of the plastic pail and adjacent the open end thereof so that the bead of the collar is received within the bead of the plastic pail;
   at least one opening formed in the supporting collar;
   a corresponding number of protuberances formed on the plastic pail and extending through aligned openings in the supporting collar; and
   interlocking means for positively locking each protuberance in its corresponding opening, whereby the collar serves to support and reinforce the plastic pail.

2. A container, as claimed in claim 1, wherein the cylindrical supporting collar includes a reinforcing bead formed centrally thereof in order to enhance the strength thereof.

3. A container, as claimed in claim 1, wherein the supporting collar includes an upwardly facing bead along the lower edge thereof.

4. A container, as claimed in claim 1, wherein the pail is fabricated from polyethylene plastic.

5. A container, as claimed in claim 1, wherein the supporting collar is fabricated from metal.

6. A container, as claimed in claim 1, wherein the supporting collar is fabricated from fiber impregnated polyethylene plastic.

7. A container, as claimed in claim 1, and further comprising closure means adapted to be attached to the container so as to close the open end of the plastic pail.

8. A reinforced container, as claimed in claim 1, wherein the interlocking means comprises:
   a generally vertical slot in each protuberance; and
   a key member received in each slot, at least one end of each key member overlying the periphery of the corresponding opening and contacting the said collar, whereby the protuberance is positively locked in its corresponding opening.

9. A container, as claimed in claim 1, wherein the interlocking means comprises a plurality of plastic retaining members, one for each protuberance, each retaining member being welded in the corresponding protuberance and overlying at least a part of the periphery of the corresponding opening and contacting the said collar in order to positively lock the protuberance in its corresponding opening.

10. A reinforced container, as claimed in claim 9, wherein the retaining members are spin welded to the protuberances.

11. A reinforced container, as claimed in claim 9, wherein the retaining members are ultrasonically welded to the protuberances.

References Cited

UNITED STATES PATENTS

| 1,420,463 | 6/1922 | Tolman | 220—73 |
| 1,910,426 | 5/1933 | Courtright | 220—59 |
| 1,938,353 | 12/1933 | Rollason | 220—91 |
| 2,139,326 | 12/1938 | Brandt | 217—89 |
| 2,606,485 | 8/1952 | Miller | 150—.5 |
| 2,630,938 | 3/1953 | Burnett | 150—48 |
| 3,035,623 | 5/1962 | Goetz | 150—48 |
| 3,074,585 | 1/1963 | Koontz | 220—83 |
| 3,101,857 | 8/1963 | Freedman | 220—73 |
| 3,199,719 | 8/1965 | Fronczek | 220—94 |

FOREIGN PATENTS

| 677,128 | 12/1929 | France. |
| 11,798 | 1904 | Great Britain. |
| 229,632 | 4/1926 | Great Britain. |

THERON E. CONDON, *Primary Examiner.*

RAPHAEL H. SCHWARTZ, *Examiner.*